(12) United States Patent
Fukazawa (10) Patent No.: US 7,953,461 B2
(45) Date of Patent: May 31, 2011

(54) MOBILE TERMINAL AND SPEAKER (75) Inventor: Kenji Fukazawa, Saitama (JP)

(73) Assignee: NEC Corporation, Tokyo (JP)

( * ) Notice: Subject to any disclaimer, the term of this patent is extended or adjusted under 35 U.S.C. 154(b) by 500 days.

(21) Appl. No.: 12/159,968

(22) PCT Filed: Nov. 24, 2006

(86) PCT No.: PCT/JP2006/323432
§ 371 (c)(1),
(2), (4) Date: Jul. 2, 2008

(87) PCT Pub. No.: WO2007/083442
PCT Pub. Date: Jul. 26, 2007

(65) Prior Publication Data
US 2009/0291718 A1 Nov. 26, 2009

(30) Foreign Application Priority Data
Jan. 20, 2006 (JP) .................................. 2006-012296

(51) Int. Cl.
H04M 1/00 (2006.01)
(52) U.S. Cl. .................................. 455/575.1; 455/569.1
(58) Field of Classification Search ............... 455/569.1, 455/575.1, 575.4, 575.5, 575.7
See application file for complete search history.

(56) References Cited

U.S. PATENT DOCUMENTS

| | | | |
|---|---|---|---|
| 6,834,181 B2 * | 12/2004 | Kaikuranta et al. | 455/90.3 |
| 6,980,828 B2 * | 12/2005 | Nousiainen | 455/556.1 |
| 7,136,625 B2 * | 11/2006 | Ylitalo et al. | 455/90.3 |
| 7,301,764 B2 * | 11/2007 | Chen | 361/694 |
| 7,565,178 B1 * | 7/2009 | Sitachitt et al. | 455/569.1 |
| 2003/0096632 A1 * | 5/2003 | Kim et al. | 455/550 |
| 2007/0087793 A1 * | 4/2007 | Noma et al. | 455/575.3 |

FOREIGN PATENT DOCUMENTS

| | | |
|---|---|---|
| JP | 2001189981 A | 7/2001 |
| JP | 2003152837 A | 5/2003 |
| JP | 2003158565 A | 5/2003 |
| JP | 2006019980 A | 1/2006 |

OTHER PUBLICATIONS

International Search Report for PCT/JP2006/323432 mailed Jan. 9, 2007.
Supplementary European Search Report for EP 06 83 3236 completed Aug. 12, 2010.

* cited by examiner

Primary Examiner — Blane J Jackson (57) ABSTRACT

A speaker includes a protector (67) which protects a speaker main body, a speaker opening (54) formed in one side surface of the speaker main body, a speaker sound hole (55) formed in the protector, and a cushion member (52) arranged on the protector. The speaker is attached to a rear side case (21) such that the speaker opening opposes a housing sound hole (21a) formed in the side surface of the rear side case (21) of a mobile telephone. Hence, a cavity (50) communicating with the housing sound hole is formed between the protector of the speaker and the major surface of the rear side case. With this structure, a distance from the speaker opening which outputs a sound generated by the speaker main body to the housing sound hole becomes shorter than in the conventional case, and the cavity can be utilized as an acoustic transfer space. Even when the mobile telephone is made thin, an increase in acoustic resistance can be suppressed, and deterioration in characteristics of a speaker output sound can be decreased.

11 Claims, 8 Drawing Sheets

MOBILE TERMINAL AND SPEAKER

TECHNICAL FIELD

The present invention relates to a mobile terminal mounted with a speaker, and a speaker mounted in a portable terminal.

BACKGROUND ART

Conventionally, the main application of a speaker mounted in a mobile terminal such as a mobile telephone is to produce a ringing tone and ringing melody to inform the user of the mobile telephone of an incoming call. Mobile terminals with a videophone function and mobile terminals with the hand-free communication function of producing an incoming sound from the speaker have become popular. A playback function of playing back video clips captured by the user has improved greatly. Also, the video clip delivery service has become popular. Along with these trends, the speaker characteristics must be ensured when the user listens to the sound and music while observing the display content of the mobile terminal.

As a method of improving the speaker characteristics when the user listens to the incoming sound, music, and the like while observing the display content, the position of a speaker sound emission hole (a hole portion through which a sound output from the speaker is emitted) arranged in the housing of the mobile terminal may be changed. For example, in a mobile telephone, a speaker sound emission hole is frequently arranged in the rear side (for example, a surface opposite to a surface where a display and operation unit are present) of the housing. The speaker sound emission hole may, however, be arranged not on the rear side of the housing but in the side surface of the housing. By arranging the speaker sound emission hole in the side surface of the housing, the directivity of the sound emitted from the speaker with respect to the front side of the display can be improved, so that the speaker characteristics can be improved.

Delivery of contents (e.g., a video image) subjected to a DSP process to have a virtual 3D (three-dimensional) effect and delivery of music subjected to a DSP process to have a virtual surround effect have been introduced. Accordingly, stereo-sound mobile telephones each mounted with two speakers are increasing. In this case, in order to obtain the stereo effect, the sounds generated by the respective speakers must be emitted from separate positions in two directions. Hence, mobile telephones in each of which speaker sound holes are arranged in the left and right side surfaces of the housing are increasing.

In a folding mobile telephone which is currently becoming most popular, speakers are frequently packaged on the rear side of a display side housing in which a speech receiver is packaged. As the apparatus (mobile terminal) becomes thinner, a reduction (particularly thickness reduction) of the packaging space for the speaker is required. To make the speaker packaging space thin, thickness reduction of the speaker and that of a packaging structure to arrange the speaker sound hole in the housing side surface of the mobile terminal are required.

Figure 15:
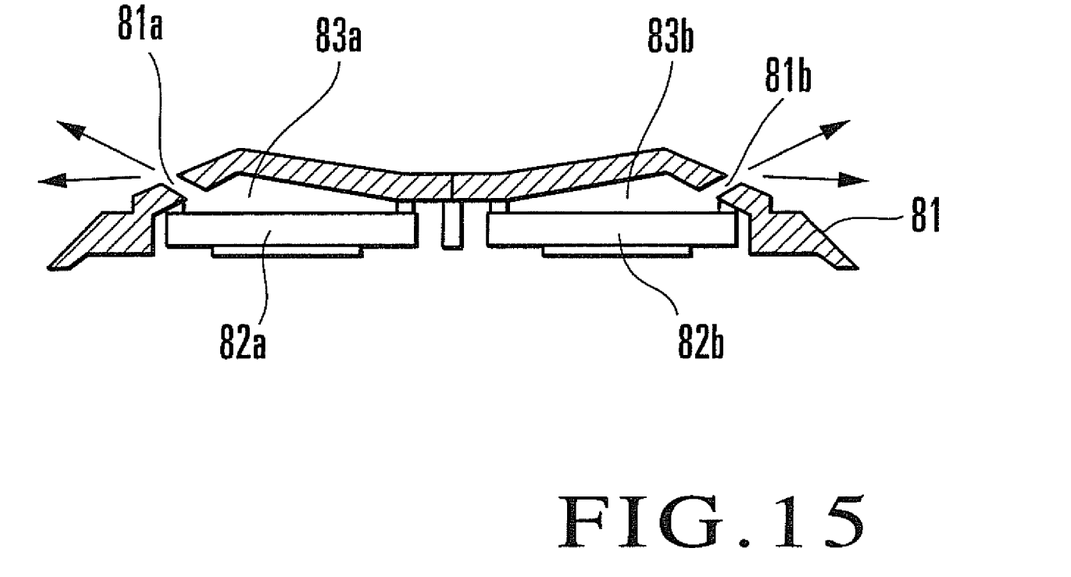
FIG. 15 is a sectional view showing the speaker packaging structure of a conventional mobile telephone mounted with twin speakers.

As a packaging structure for a speaker in a stereo-sound mobile telephone, for example, Japanese Patent Laid-Open No. 2003-152837 (reference 1) describes a mobile telephone mounted with twin speakers. FIG. 15 is a sectional view showing the speaker packaging structure of the mobile telephone mounted with the twin speakers described in reference 1. As shown in FIG. 15, in the mobile telephone described in reference 1, output sounds of left and right speakers are emitted from two sound emission holes 81a and 81b formed in the left and right side surfaces of a rear side housing 81.

More specifically, in the mobile telephone described in reference 1, two compact speakers 82a and 82b are axis-symmetrically packaged in the rear housing to be horizontal with respect to the rear housing. The speakers 82a and 82b are arranged such that the speaker front surfaces where the sounds are output oppose the rear side housing 81. Cavities 83a and 83b formed between the rear side housing 81 and the respective speakers 82a and 82b are utilized as acoustic transfer spaces from the speakers 82a and 82b to the sound emission holes 81a and 81b of the housing. The respective speaker sounds are emitted from the two sound emission holes 81a and 81b formed in the housing.

DISCLOSURE OF INVENTION

Problems to be Solved by the Invention

In the mobile telephone described in reference 1, to output the output sounds from the compact speakers 82a and 82b through the sound emission holes 81a and 81b of the rear side housing without being deteriorated, the cavities 83a and 83b between the rear side housing 81 and the speaker front surfaces must be formed to reliably have certain volumes. For this purpose, the rear side housing 81 must be swelled. This undesirably increases the thickness of the housing, thus interfering with the thickness reduction of the apparatus (mobile terminal).

In the mobile telephone described in reference 1, if the swell of the rear housing is eliminated to decrease the space volumes of the cavities 83a and 83b in front of the speakers so that the housing becomes thin, the sound path structures from the speakers 82a and 82b to the housing sound holes 81a and 81b form acoustic resistances. This largely deteriorates the output sound pressures from the speakers 82a and 82b.

The present invention has been made to solve the above problems, and has as its object to decrease deterioration in characteristics of the speaker output sound while reducing the thickness of the mobile terminal.

Means of Solution to the Problems

A mobile terminal according to the present invention comprises a housing component including a major surface and a side surface, and a speaker built in the housing component, the housing component comprising a housing side sound hole which is formed in the side surface and outputs a sound from the speaker outside the housing component, and the speaker comprising a speaker main body which generates the sound, a protector as a plate-like component which is arranged on a major surface of the speaker main body opposing the major surface of the housing component and protects the speaker main body, a speaker opening which is formed in one side surface of the speaker main body opposing the housing side sound hole and outputs the sound generated by the speaker main body toward the housing side sound hole, a support member which is arranged on the protector, supports the speaker attached to the housing component, and forms a cavity communicating with the housing side sound hole between the protector and the housing component, and a speaker side sound hole which is formed in the protector and outputs the sound generated by the speaker main body to the cavity.

A speaker according to the present invention comprises a speaker main body which generates a sound, a protector as a plate-like component which is arranged on a major surface of the speaker main body and protects the speaker main body, a support member arranged on the protector and having a predetermined height, a speaker opening which is formed in one side surface of the speaker main body and outputs the sound generated by the speaker main body outside, and a speaker side sound hole which is formed in the protector and outputs the sound generated by the speaker main body outside.

EFFECTS OF THE INVENTION

According to the present invention, the housing side sound hole is formed in the side surface of the housing component, and the speaker opening is formed in one side surface of the speaker main body which opposes the housing side sound hole. With this structure, the distance from the speaker opening which outputs the sound generated by the speaker main body to the housing side sound hole decreases. Even when the space volume of the cavity formed between the protector of the speaker and the housing component is not as large as in the conventional case, the acoustic resistance can be decreased. Hence, deterioration in characteristics of the speaker output sound can be decreased while decreasing the thickness of the mobile terminal.

According to the present invention, the support member to form the cavity between the protector and the housing component is arranged on the protector of the speaker, and the speaker side sound hole which outputs the sound generated by the speaker main body is formed in the protector. Thus, the cavity can be utilized as an acoustic transfer space, so that the acoustic resistance can be further decreased. Consequently, deterioration in characteristics of the speaker output sound can be further decreased.

According to the present invention, a groove is formed in the housing component to extend in a direction perpendicular to the housing side sound hole. When compared to a case in which no groove is formed, a larger acoustic transfer space can be ensured, so that deterioration in acoustic characteristics can be decreased while ensuring the strength of the housing.

BEST MODE FOR CARRYING OUT THE INVENTION

First Exemplary embodiment

Figure 1A:
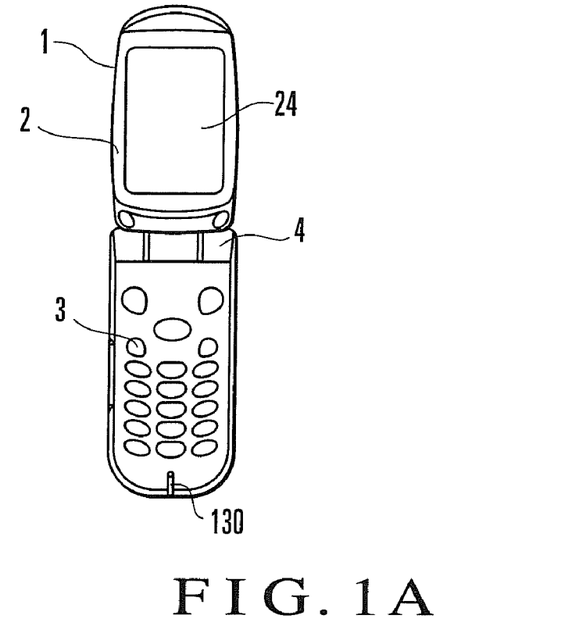
FIGS. 1A to 1C are explanatory views showing an example of a mobile terminal which employs a speaker attaching structure according to the present invention.
Figure 1B:
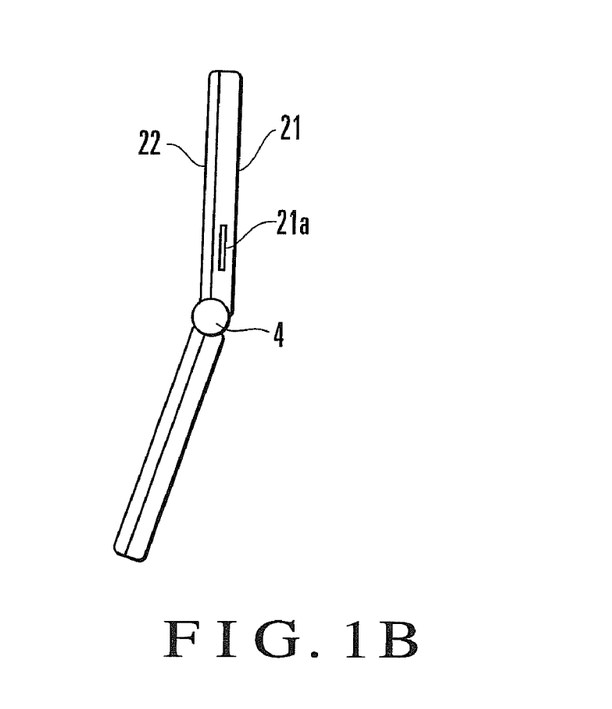
Figure 1C:
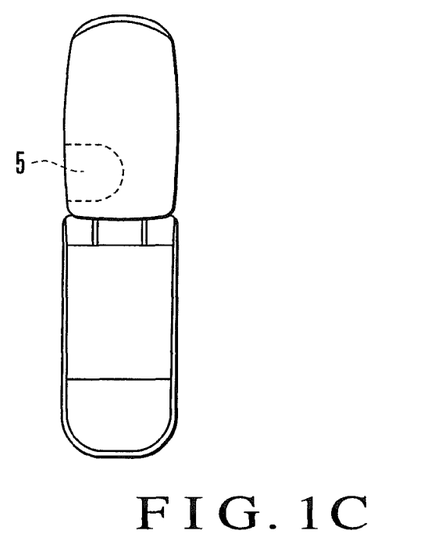

The first exemplary embodiment of the present invention will be described hereinafter with reference to the drawings. FIGS. 1A to 1C are explanatory views showing an example of a mobile terminal which employs a speaker attaching structure according to the present invention. FIG. 1A corresponds to a front view of the mobile terminal seen from the front surface. FIG. 1B corresponds to a side view of the mobile terminal seen from the side surface. FIG. 1C corresponds to a rear view of the mobile terminal seen from the rear surface. In this exemplary embodiment, when observing the mobile terminal, a surface that includes an operation unit and display will be referred to as the front side.

In this exemplary embodiment, a case will be described in which the mobile terminal is a mobile telephone 1 (e.g., a mobile telephone employing the W-CDMA scheme or GCS scheme) having a folding structure, as shown in FIGS. 1A to 1C. The mobile terminal may be a mobile telephone other than a folding mobile telephone. The mobile terminal is not limited to a mobile telephone but may be a terminal such as a PHS. The mobile terminal may be a mobile electronic equipment (e.g., a PDA) mounted with a speaker to produce a sound (e.g., a melody or operation sound).

As shown in FIG. 1A, the mobile telephone 1 having the folding structure includes a first housing portion 2 (to be referred to as an upper housing portion 2 hereinafter) having a display 24 and receiver speaker 26, and a second housing portion 3 (to be referred to as a lower housing portion 3 hereinafter) having a key operation unit, a microphone 130, and the like. In the mobile telephone 1, the upper housing portion 2 and lower housing portion 3 are pivotally connected to each other through a hinge 4 provided to the lower end of the upper housing portion 2. When the mobile telephone 1 is pivoted at the hinge 4, the upper housing portion 2 can be opened from and closed on the lower housing portion 3.

Note that "to pivot" means to allow clockwise and counterclockwise circular motion about a certain axis. In this exemplary embodiment, concerning the longitudinal direction of the mobile telephone 1, the direction where the display 24 and the receiver speaker (26) exist is also expressed as the upper side, and the direction where the key operation unit and the microphone 130 exist is also expressed as the lower side.

As shown in FIG. 1C, a speaker 5 to produce a ringing tone and ringing melody is arranged in the upper housing portion 2. In this case, the speaker 5 is arranged in the upper housing portion 2 to be located above the hinge 4. As shown in FIG. 1B, the mobile telephone 1 has, in the side surface of the upper housing portion 2, a housing sound hole (housing side sound hole) 21a serving as a hole through which the sound from the speaker 5 is emitted outside the upper housing portion 2. When the speaker 5 outputs a sound, the output sound of the speaker 5 is emitted from the housing sound hole 21a arranged in the housing side surface of the upper housing portion 2.

The lower housing portion 3 includes, as the main constituent elements, an input key side (front side) case (housing component), a rear side case (housing component), a circuit board, input keys, a microphone serving as a sound input means, an earphone jack, a throttle through which a memory card for recording an image or melody data is to be inserted, a battery, and the like. A power supply, a key input unit, a display, a driving circuit for driving a speaker or the like, an integrated circuit, a radio circuit, and the like are formed on the circuit board.

Figure 2:
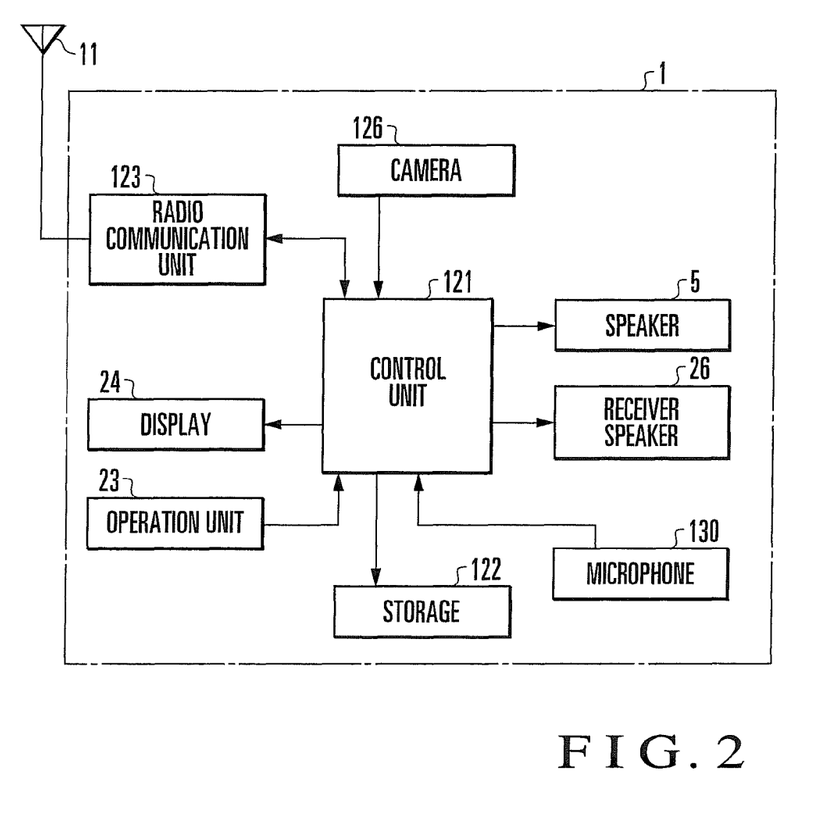
FIG. 2 is a block diagram showing a configuration example of a mobile telephone.

FIG. 2 is a block diagram showing a configuration example of the mobile telephone 1. As shown in FIG. 2, the mobile telephone 1 comprises an antenna 11 which transmits/receives radio waves, a control unit 121, a storage 122, a radio communication unit 123, an operation unit 23, the display 24, a camera unit (to be referred to as a "camera" hereinafter) 126, the receiver speaker 26, the sound input microphone 130, and the speaker 5 for producing a ringing melody and an incoming sound during hand-free communication.

The control unit 121 comprises, e.g., a CPU (central processing unit) and various types of peripheral circuits (not shown), and has a function of controlling the respective units provided to the mobile telephone 1.

The storage 122 comprises a storage medium such as a RAM, and stores various types of data such as a control program which runs in the control unit 121. Part of the storage 122 may comprise a ROM, or the ROM portion may store the control program.

The radio communication unit 123 has a function of modulating/demodulating a signal in accordance with a predetermined communication protocol. More specifically, the radio communication unit 123 performs a process of receiving a radio signal through the antenna 11 and demodulating the received radio signal. The radio communication unit 123 also performs a process of modulating a signal output from the control unit 121 and transmitting the radio signal via the antenna 11.

The operation unit 23 comprises key buttons to input, e.g., a telephone number. The operation unit 23 has a function of outputting an input signal corresponding to the user operation to the control unit 121.

The display 24 comprises, e.g., an LCD (Liquid Crystal Display) and is disposed at a position which is inside the housing when the mobile telephone 1 is folded. The display 24 displays, e.g., a standby window, a function setting window, and the like.

The camera 126 has various types of functions provided to, e.g., a digital camera, and comprises an imaging device such as a CCD which captures the image of an object and a circuit which outputs image data obtained by the image capture to the control unit 121.

Figure 3:
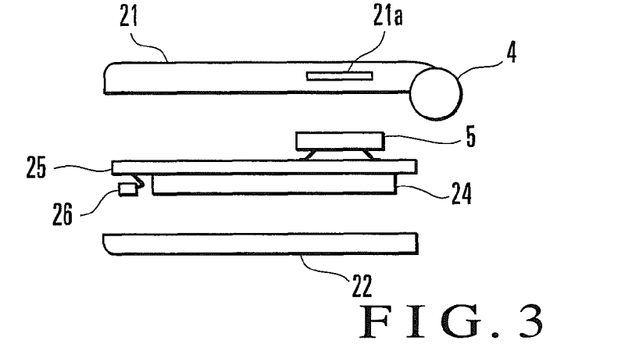
FIG. 3 is an explanatory view showing the upper housing portion of the mobile telephone in an exploded state.

The structure of the upper housing portion 2 of the mobile telephone 1 will be described. FIG. 3 is an explanatory view showing the upper housing portion 2 of the mobile telephone 1 in an exploded state. As shown in FIG. 3, the upper housing portion 2 includes a front side housing component (to be referred to as a display side case hereinafter) 22, a rear side housing component (to be referred to as a rear side case hereinafter) 21, a circuit board 25, the display 24, the receiver speaker 26, and the speaker 5. As shown in FIG. 3, the rear side case 21 has the housing sound hole 21a serving as a hole through which the sound produced by the speaker 5 is output.

The display 24 is a liquid crystal display device mounted on the circuit board 25. The receiver speaker 26 is a speaker to produce an incoming sound. The speaker 5 is a speaker to produce the incoming sound during hand-free communication, a ringing tone, and a ringing melody. The circuit board 25, display 24, receiver speaker 26, and speaker 5 are stored in the housing of the upper housing portion 2 as they are held by the display side case 22 and rear side case 21 from the two, front direction and rear direction.

According to this exemplary embodiment, the speaker 5 is electrically connected as the spring terminal of the speaker 5 comes into contact with the land of the circuit board 25. The electrical connection method of electrically connecting the speaker 5 may be a connection method using a connector with a lead wire, or a method of soldering the input terminal of the speaker 5 to the land of the circuit board 25 through a lead wire. The electrical connection method of the speaker 5 may be a method of providing a contact land to the main body of the speaker 5 and connecting the speaker 5 using a double-pole connector as a typical pin connector mounted on the circuit board 25.

Figure 4:
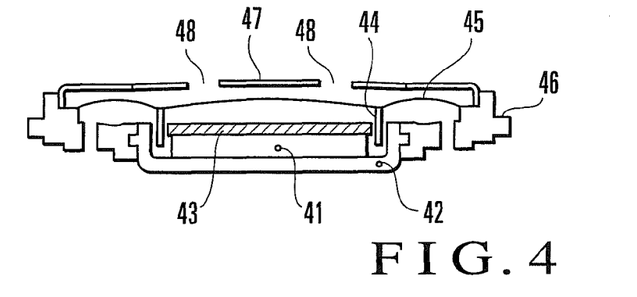
FIG. 4 is a sectional view showing the basic structure of a dynamic type speaker.

The structure of the speaker 5 mounted in the mobile telephone 1 will be described. According to this exemplary embodiment, the speaker 5 mounted in the mobile telephone 1 is a dynamic type speaker. First, the basic arrangement of the dynamic type speaker will be described. FIG. 4 is a sectional view showing the basic structure of the dynamic type speaker.

As shown in FIG. 4, the dynamic type speaker includes a magnet 41 comprising a permanent magnet made of neodymium or the like. The dynamic type speaker also includes a yoke 42 made of a thin steel plate material such as SPC to form the magnetic flux of the magnet 41 efficiently. The dynamic type speaker also includes a top plate 43 to form a magnetic flux between the yoke 42 and top plate 43. In the dynamic type speaker, a voice coil 44 is arranged in the gap (to be referred to as the magnetic gap hereinafter) between the yoke 42 and top plate 43. The dynamic type speaker also includes a diaphragm 45 formed as a thin film made of PET (polyethylene terephthalate) or the like.

In the dynamic type speaker shown in FIG. 4, the magnetic flux is obtained by supplying an AC current to the voice coil 44 arranged in the magnetic gap. A driving force generated by the magnetic flux vibrates the diaphragm 45, thus producing a sound.

The dynamic type speaker includes, as another constituent element, a frame 46 which holds the yoke 42 and constitutes the outer shell of the speaker. The frame 46 is formed by molding a plastic material such as PPA (polyphthalamide). The dynamic type speaker includes a protector 47 adhered to the frame 46 to protect the diaphragm 45. The protector 47 is fabricated from a thin steel plate material such as SPC.

The dynamic type speaker also includes speaker sound holes 48 as holes to emit the generated output sound. The plurality of speaker sound holes 48 are formed in the protector 47. When packaging the dynamic type speaker in the housing, the housing comes into contact with the front surface of the protector 47 through the cushion member, and the output sound is emitted through the sound emission holes formed in the housing. Note that "to come into contact" means to contact in an abutting state.

Figure 5:
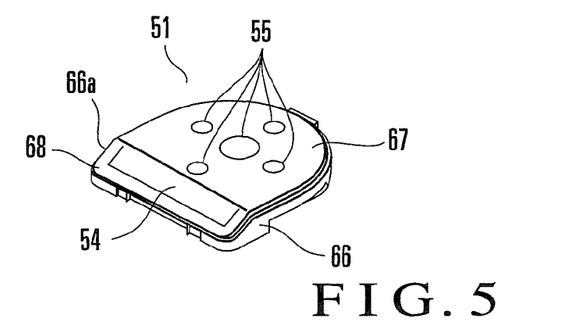
FIG. 5 is a perspective view showing a state in which a protector is attached to the speaker main body of the speaker.

FIG. 5 is a perspective view showing a state in which the protector is attached to the speaker main body of the speaker 5. According to this exemplary embodiment, a portion obtained by excluding a protector 67, cushion member 52, and dustproof mesh 53 (each will be described later) from the speaker 5 will be referred to as a speaker main body 51. Of the respective surfaces of the speaker main body 51, with the speaker main body 51 being attached to the rear side case 21, that surface which opposes the rear side case 21 will be referred to as the major surface, and that surface which is on a side opposite to the major surface will be referred to as the lower surface. FIG. 5 corresponds to a perspective view seen from an oblique direction so that the major surface side of the speaker main body 51 can be seen. The mechanism with which the speaker 5 produces a sound is identical to the mechanism with which the dynamic type speaker shown in FIG. 4 produces the sound.

As shown in FIG. 5, the protector 67 to protect the diaphragm in the speaker 5 is attached to the major surface of the speaker main body 51 of the speaker 5. The protector 67 is a plate-like component to protect the speaker main body 51, and is fabricated from, e.g., a thin steel plate material such as SPC.

The speaker main body 51 includes, on its side surface, a resin frame 66 to hold the yoke in the speaker 5. The resin frame 66 is formed by molding a synthetic resin such as PPA (polyphthalamide). As shown in FIG. 5, an inclined portion 66a having a shape oblique to the surface of the protector 67 is formed on one side surface of the resin frame 66. As shown in FIG. 5, the inclined portion 66a has an opening (to be referred to as a speaker opening hereinafter) 54. According to this exemplary embodiment, the speaker 5 emits the sound generated by the inner diaphragm through the speaker opening 54.

As shown in FIG. 5, the protector 67 has a plurality of openings 55. According to this exemplary embodiment, the respective openings 55 serve as sound holes to emit the sound generated by the speaker 5. The respective openings formed in the protector 67 will be referred to as the speaker sound holes (speaker side sound holes) 55 hereinafter. In the example shown in FIG. 5, five speaker sound holes 55 are formed in the protector 67. Two to four speaker sound holes 55, or six or more speaker sound holes 55 may be formed in the protector 67. Alternatively, only one speaker sound hole 55 may be formed in the protector 67.

As show in FIG. 5, the speaker 5 does not have a shape that covers the speaker main body 51 entirely with the protector 67 and resin frame 66. That side of the speaker 5 where the inclination (inclined portion 66a) of the resin frame 66 is present is not bonded but forms an opening shape (speaker opening 54).

As shown in FIG. 5, the inclined portion 66a of the resin frame 66 is not entirely opened as the speaker opening 54, but has an adhering portion 68 with a predetermined width. According to this exemplary embodiment, a predetermined cushion member is adhered to the adhering portion 68 of the inclined portion 66a. More specifically, the inclined portion 66a of the resin frame 66 is provided with the cushion adhering portion 68 extending along the three sides of the speaker opening 54 and having a width where the cushion member (the cushion member which can be adhered when packaging the speaker 5 in the case) can be adhered.

Figure 6:
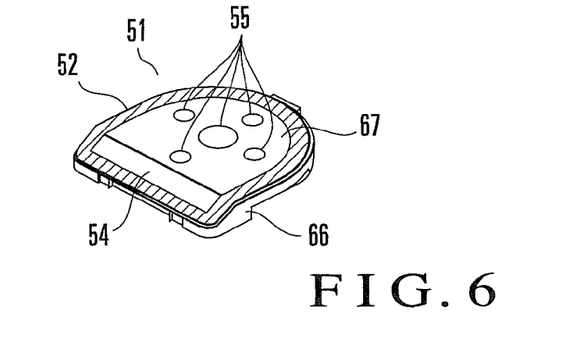
FIG. 6 is a perspective view showing a state in which a cushion member is adhered to the speaker main body.

FIG. 6 is a perspective view showing a state in which the cushion member is adhered to the speaker main body 51. Note that what FIG. 6 shows corresponds to the cushion adhering portion 68 and protector 67 of the speaker main body 51 shown in FIG. 5, with the cushion member 52 being adhered to them. As shown in FIG. 6, the annular cushion member 52 is adhered to the protector 67 attached to the speaker main body 51. According to this exemplary embodiment, the inner diameter of the cushion member 52 is determined such that when the cushion member 52 is adhered to the protector 67, it does not close the respective speaker sound holes 55 of the protector 67. The cushion member 52 is adhered to the cushion adhering portion 68 and the peripheral portion of the protector 67 using an adhesive member such as a double-coated tape. According to this exemplary embodiment, as shown in FIG. 6, the cushion member 52 is adhered to form a wall that surrounds that region of the protector 67 where the respective speaker sound holes 55 are formed.

The cushion member 52 is fabricated from a closed-cell foam such as poron. According to this exemplary embodiment, the cushion member 52 is adhered to the speaker main body 51 and brought into contact with the housing, so that sound leakage from the speaker 5 into the interior of the housing can be prevented.

Figure 7:
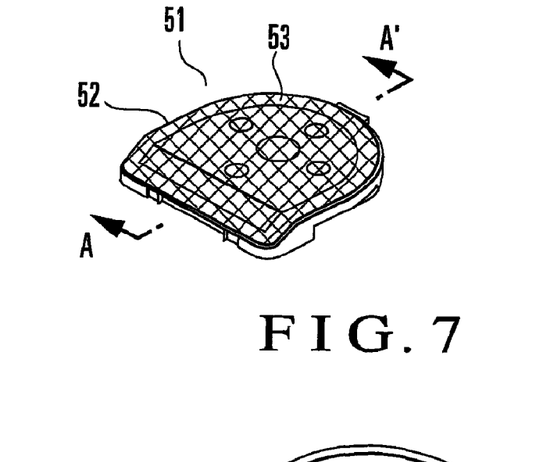
FIG. 7 is a perspective view showing a state in which a dustproof mesh is attached to the speaker main body.

With the cushion member 52 being adhered to the speaker main body 51, the dustproof mesh 53 is attached to the speaker main body 51 so that the dust entering from the housing sound hole 21a does not enter the speaker 5. FIG. 7 is a perspective view showing a state in which the dustproof mesh is attached to the speaker main body 51. Note that what FIG. 7 shows corresponds to the protector 67 on the speaker main body 51 shown in FIGS. 5 and 6, with the dustproof mesh 53 being attached to it. With the cushion member 52 being adhered to the protector 67, the dustproof mesh 53 is adhered to the cushion member 52 by using, e.g., a double-coated tape.

Figure 8:
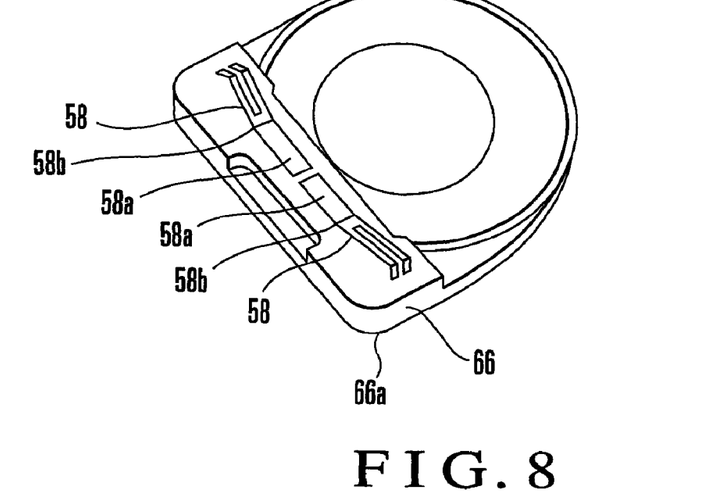
FIG. 8 is a perspective view of the speaker seen from an oblique direction so that the lower surface can be seen.

FIG. 8 is a perspective view of the speaker 5 seen from an oblique direction so that the lower surface can be seen. As shown in FIG. 8, the speaker 5 includes two connection terminals 58 on its lower side to be brought into contact with the land of the circuit board 25. The connection terminals 58 are fabricated from a plate-like metal material, and are provided with predetermined bend portions 58b as shown in FIG. 8 to have spring properties (elasticity). As shown in FIG. 8, the connection terminals 58 respectively have attaching portions 58a to be attached to the speaker 5 so as to face the lower surface of the speaker 5. By using the connection terminals 58 having such an arrangement, a space necessary for the connection terminals 58 can be decreased, so that the thickness of the mobile telephone 1 can be decreased.

Figure 9:
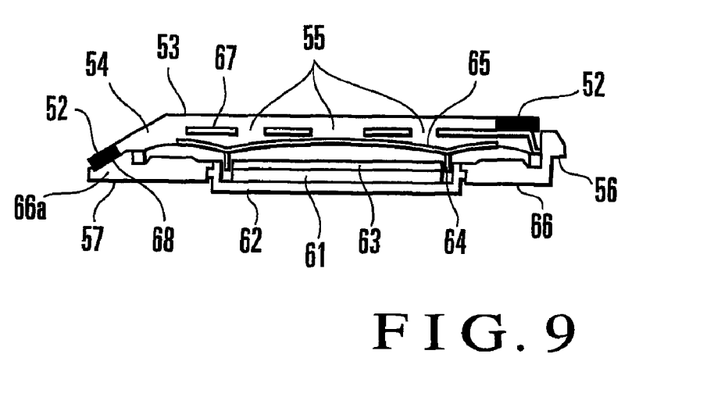
FIG. 9 is a sectional view showing the structure of the speaker.

FIG. 9 is a sectional view showing the structure of the speaker 5. FIG. 9 corresponds to a sectional view of the speaker 5 taken along a plane (the plane A-A' show in FIG. 7) perpendicular to the longitudinal direction of the speaker opening 54.

The mechanism with which the speaker 5 produces the sound is identical to that of the dynamic type speaker shown in FIG. 4. The speaker 5 includes a magnet 61 comprising a permanent magnet made of neodymium or the like. The speaker 5 also includes a yoke 62 to form the magnetic flux of the magnet 61 efficiently. The yoke 62 is fabricated from, e.g., a thin steel plate material such as SPC. The speaker 5 also includes a top plate 63 to form a magnetic flux between the yoke 62 and top plate 63. In the speaker 5, a voice coil 64 is arranged in the magnetic gap between the yoke 62 and top plate 63. The speaker 5 also includes a diaphragm 65 formed as a thin film made of PET (polyethylene terephthalate) or the like.

According to this exemplary embodiment, the magnetic flux is obtained by supplying an AC current to the voice coil 64. When a driving force generated by the magnetic flux vibrates the diaphragm 65, air is vibrated, thus producing a sound.

The speaker 5 includes, as another constituent element, the resin frame 66 which holds the yoke 62 and constitutes the outer shell of the speaker 5. The resin frame 66 is formed by molding a plastic material such as PPA (polyphthalamide). The speaker 5 includes the protector 67 adhered to the resin frame 66 to protect the diaphragm 65. The protector 67 has the plurality of speaker sound holes 55 as holes to emit the generated sound. When packaging the speaker 5 in the housing of the mobile telephone 1, the rear side case 21 comes into contact with the front surface of the protector 67 through the cushion member 52 adhered to the protector 67, and the speaker output sound is emitted through the housing sound hole 21a formed in the rear side case 21.

The resin frame 66 includes a fitting pawl 56 to fit in the rear side case 21 for fixing, and a fitting seating surface 57. More specifically, the resin frame 66 includes the fitting pawl 56 to fit with a fitting hook 21f of the rear side case 21 (to be described later). The resin frame 66 also includes the fitting seating surface 57 to fit with the fitting portion 21e of the rear side case 21. Note that "to fit" means to fit portions having matching shapes.

Of the respective side surfaces of the resin frame 66, that side surface which opposes the fitting pawl 56 has an inclined portion 66a which is inclined at an angle of, e.g., 45°. The protector 67 is not in contact with the resin frame 66, and the inclined portion 66a has the speaker opening 54. The speaker output sound is emitted from the speaker opening 54. The inclined portion 66a of the resin frame 66 is provided with the cushion adhering portion 68, as shown in FIG. 5, and the cushion member 52 is adhered to the adhering portion 68.

Figure 10A:
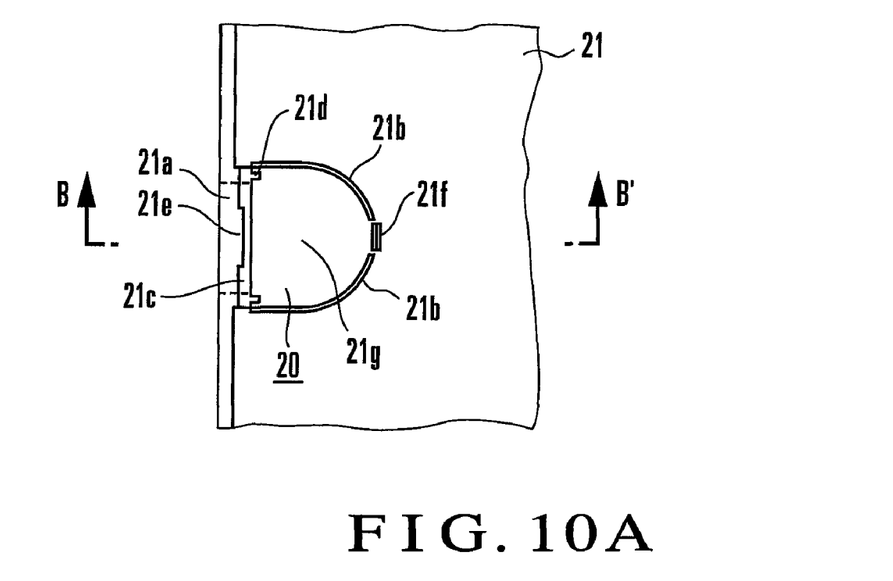
FIGS. 10A and 10B are explanatory views showing an example of the structure of the speaker packaging portion of a rear side case.
Figure 10B:
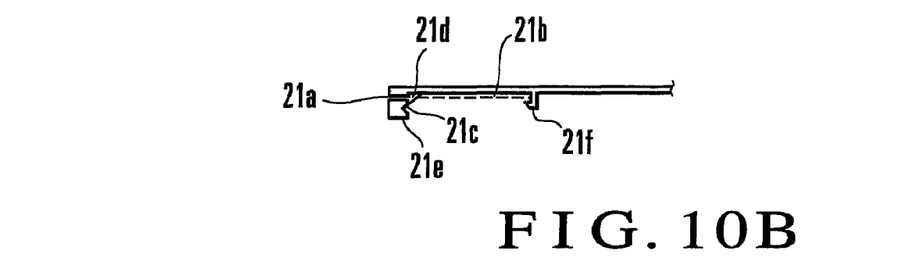
Figure 11:
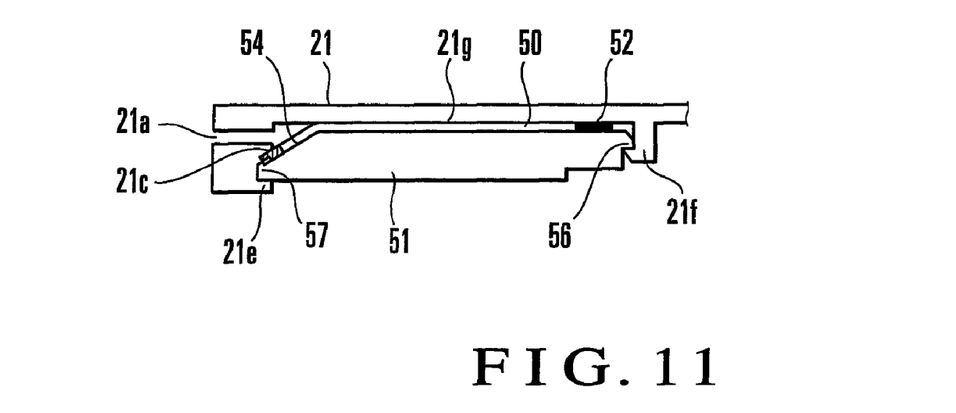
FIG. 11 is a sectional view of the rear side case, with the speaker being attached, cut at the portion of the speaker packaging portion.

The structure of the rear side case 21 to which the speaker 5 is to be attached will be described. FIGS. 10A and 10B are explanatory views showing an example of the structure of the speaker packaging portion of the rear side case 21. FIG. 10A corresponds to a front view of a speaker packaging portion 20 of the rear side case 21 and its periphery seen from the front side (that is, the major surface side where the display 24 exists). FIG. 10B corresponds to a sectional view of the rear side case 21 taken at the portion (the B-B' plane shown in FIG. 10A) of the speaker packaging portion 20. FIG. 11 is a sectional view of the rear side case 21, with the speaker 5 being attached to the rear side case 21, cut at the portion of the speaker packaging portion 20.

As shown in FIGS. 10A, 10B, and 11, the side surface of the rear side case 21 is provided with the housing sound hole 21a. The rear side case 21 is provided with the speaker packaging portion 20, to which the speaker 5 is to be attached, at a position in contact with the side surface where the housing sound hole 21a is formed. As shown in FIG. 11, the speaker 5 is attached such that that side surface where the speaker opening 54 exists opposes the side surface of the rear side case 21. More specifically, the speaker 5 is attached to the rear side case 21 such that the position of the speaker opening 54 coincides with the position of the housing sound hole 21a. The speaker output sound generated by the speaker 5 is emitted outside the housing through the speaker opening 54 and housing sound hole 21a.

The rear side case 21 is provided with speaker fixing ribs 21b to fix the speaker 5, so that when attaching the speaker 5, the center of the housing sound hole 21a coincides with the center of the speaker opening 54. In this case, the speaker fixing ribs 21b vertically hang downward from a speaker seating surface portion 21g to conform to the outer shell of the speaker 5. More specifically, the speaker fixing ribs 21b are provided to form a wall around the speaker 5 when the speaker 5 is fixed.

As shown in FIGS. 10A and 10B, the inner edge of the housing sound hole 21a of the rear side case 21 is provided with cushion urging ribs 21d to fix the inclined portion 66a of the speaker 5 through the cushion member 52. When attaching the speaker 5, the cushion urging ribs 21d come into contact with a cushion abutting surface 21c and the cushion member 52 of the speaker 5 to be parallel to the speaker opening 54, thus preventing sound leakage to the interior of the housing. As shown FIG. 10A, the cushion urging ribs 21d are arranged on the left and right sides of the housing sound hole 21a.

As shown in FIG. 11, the rear side case 21 is provided with the fitting portion 21e to fit with the fitting seating surface 57 of the speaker opening 54 when attaching the speaker 5. The rear side case 21 is also provided with the fitting hook 21f to fit with the fitting pawl 56 of the speaker 5, thus fixing the rear side case 21.

The speaker 5 is attached to the rear side case 21 with the structure described above. Thus, when packaging the speaker 5, the cushion member 52 adhered to the protector 67 of the speaker 5 is attached in contact with the speaker seating surface portion 21g of the rear side case 21. As the cushion member 52 is attached in contact with the speaker seating surface portion 21g, a cavity 50 communicating with the housing sound hole 21a is formed between the speaker seating surface portion 21g of the rear side case 21 and the protector 67 of the speaker 5. More specifically, the cushion member 52 serves as a support member to support the speaker 5 attached to the rear side case 21 and to form the cavity 50 between the protector 67 and rear side case 21. This arrangement can prevent sound leakage of the speaker output sound to the interior of the housing.

The operation will be described. As shown in FIG. 11, with the speaker 5 being attached to the rear side case 21, the cushion member 52 on the side of the speaker opening 54 which is adhered to the speaker main body 51 is abutted against the cushion abutting surface 21c of the rear side case 21. The fitting seating surface 57 of the speaker 5 is in contact with the fitting portion 21e of the rear side case 21, and the cushion member 52 is held at a height where the original thickness is compressed by about 20%.

The cushion member 52 adhered to the front surface of the protector 67 of the speaker 5 is abutted against the speaker seating surface portion 21g of the rear side case 21. The fitting pawl 56 of the speaker 5 fits with the fitting hook 21f of the rear side case 21, and the cushion member 52 is held at a height where the original thickness is compressed by about 20%.

As shown in FIG. 6, the cushion member 52 has such a size that the speaker sound holes 55 fall within its inner diameter. The cushion member 52 is adhered to the adhering portion 68 and the outer periphery of the protector 67 using an adhesive member such as a double-coated tape. With this arrangement, the output sound output from the speaker opening 54 of the speaker 5 and the output sound from the speaker sound holes 55 are emitted outside through the housing sound hole 21a formed in the side surface of the rear side case 21 while they are prevented by the cushion member 52 from leaking into the housing.

Figure 12:
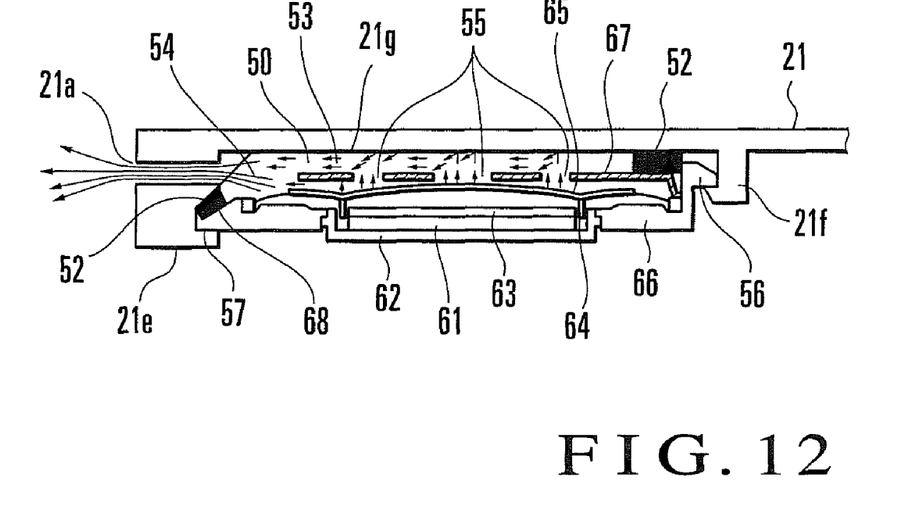
FIG. 12 is an explanatory view showing the flow of a sound when the speaker generates the sound.

The operation of the speaker 5 to generate the sound will be described. FIG. 12 is an explanatory view showing the flow of the sound when the speaker 5 generates the sound. Note that FIG. 12 corresponds to a sectional view showing a state in which the speaker 5 is packaged in the rear side case 21 of the upper housing portion 2. The internal structure of the speaker 5 and how the speaker output sound is emitted will be described hereinafter with reference to FIG. 12.

The speaker 5 is packaged in the rear side case 21, as described above. When the speaker 5 is to generate the sound, the AC current is supplied to the voice coil 64 arranged in the magnetic gap formed by the top plate 63 adhered to the magnet 61 and the yoke 62, so that a magnetic flux is obtained. In the speaker 5, a driving force generated by the obtained magnetic flux and the magnetic flux generated in the magnetic gap by the magnet 61 vibrates the diaphragm 65 vertically. When the diaphragm 65 vibrates vertically, the speaker 5 vibrates air, thus generating a sound.

As shown in FIG. 12, the sound (to be also referred to as a speaker sound hereinafter) output by the vibration of the diaphragm 65 is output outside the housing from the speaker opening 54 of the speaker 5 and the housing sound hole 21a of the rear side case 21. The speaker sound is emitted not only from the speaker opening 54 but also from the speaker sound holes 55 formed in the protector 67 of the speaker 5. As shown in FIG. 12, by utilizing the cavity 50 formed between the speaker seating surface portion 21g and cushion member 52 as the acoustic transfer space, the speaker sound is emitted outside the housing from the housing sound hole 21a.

As described above, the side surface of the rear side case 21 is provided with the housing sound hole 21a, and one side surface of the speaker main body 51 which opposes the housing sound hole 21a is provided with the speaker opening 54. With this structure, the distance from the speaker opening 54 which outputs the sound generated by the speaker 5 to the housing sound hole 21a decreases. Even when the space volume of the cavity 50 formed between the protector 67 of the speaker 5 and the rear side case 21 is not as large as in the conventional case, the acoustic resistance can be decreased. Hence, deterioration in characteristics of the speaker output sound can be decreased while reducing the thickness of the mobile telephone 1.

Also, the output sound of the speaker 5 is emitted not only from the speaker opening 54 but also from the speaker sound holes 55 formed in the protector 67. This can further decrease deterioration of the sound generated by the speaker 5 due to the acoustic resistance of the protector 67, housing sound hole 21a, and the like which are arranged close to the diaphragm 65 for the purpose of thickness reduction.

For example, assume that the protector 67 has no speaker sound holes 55 and that the sound is output only from the speaker opening 54. The generated sound is undesirably attenuated by the acoustic resistance of the protector 67 before reaching the speaker opening 54. According to this exemplary embodiment, a route is provided through which the sound is emitted from the speaker sound holes 55 formed in the protector 67. The cavity 50 formed between the protector 67 and speaker seating surface portion 21g is utilized as the acoustic transfer space. This decreases deterioration in speaker sound using the acoustic effect. When the speaker 5 generates a sound with a frequency in the band of about 1 kHz to 4 kHz, deterioration of the sound pressure of about 2 dB to 3 dB can be decreased.

Figure 13:
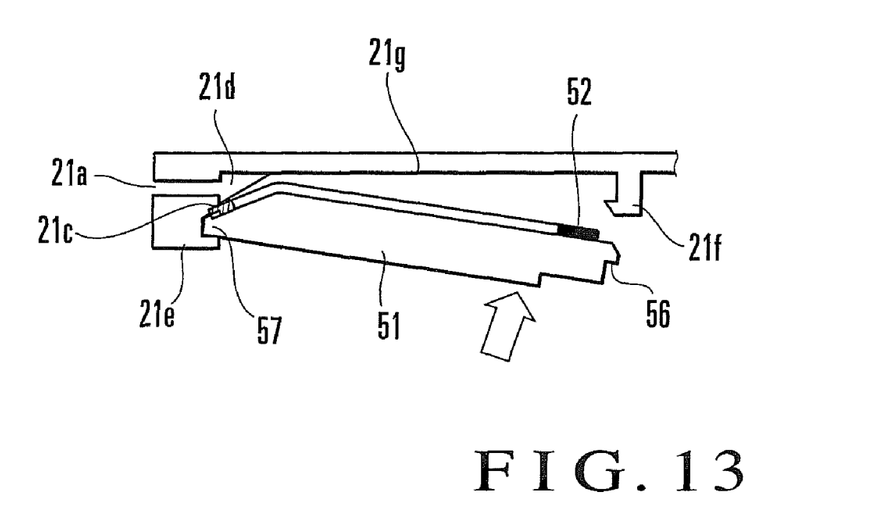
FIG. 13 is an explanatory view showing a method of attaching the speaker to the rear side case.

A method of building the speaker 5 in the rear side case 21 will be explained. FIG. 13 is an explanatory view showing the method of attaching the speaker 5 to the rear side case 21. Note that FIG. 13 corresponds to a sectional view of the speaker packaging portion 20 and speaker 5 when attaching the speaker 5 to the rear side case 21 of the upper housing portion 2.

First, the outer shell portion of the speaker 5 is aligned with the speaker fixing ribs 21b provided to the rear side case 21. That portion of the cushion member 52 adhered to the speaker main body 51 which is on the side of the speaker opening 54 is abutted against the cushion abutting surface 21c of the rear side case 21 with a pressure that compresses the cushion member 52 by about 20% the original thickness. Then, the fitting seating surface 57 of the speaker 5 is fitted with the fitting portion 21e of the rear side case 21. This allows alignment of the center of the speaker opening 54 of the speaker 5 with the center of the housing sound hole 21a, and the cushion urging ribs 21d of the rear side case 21 are brought into contact with the cushion member 52.

Subsequently, a pressure is applied to the speaker 5 on the side of the fitting pawl 56, so that the cushion member 52 adhered to the protector 67 is abutted against the speaker seating surface portion 21g of the rear side case 21, and that the fitting pawl 56 of the speaker 5 is fitted with the fitting hook 21f of the rear side case 21. With the speaker 5 being packaged, the cushion member 52 is fixed as it is compressed by about 20%.

As described above, according to this exemplary embodiment, in the packaging structure of the speaker 5 of the mobile telephone 1 having the housing sound hole 21a in the housing side surface, the inclined portion 66a is formed on one side surface of the speaker 5, and the speaker opening 54 is formed in the inclined portion 66a. Also, the speaker sound holes 55 are formed in the protector 67 on the top surface of the speaker 5. Furthermore, the cushion member 52 is adhered to cover the inclined portion 66a of the speaker 5 and part of the protector 67. In this case, the cushion member 52 is adhered by extension so that the speaker sound holes 55 formed in the protector 67 fall within the inner diameter of the cushion member 52. With this arrangement the distance from the speaker opening 54 which outputs the sound generated by the speaker 5 to the housing sound hole 21a decreases, and the space formed between the rear side case 21 and protector 67 can be utilized as the acoustic transfer space. Even when the capacity of the cavity 50 on the top surface of the speaker 5 decreases due to the thickness reduction of the housing, the acoustic resistance generated when packaging the speaker 5 can be decreased, and deterioration in speaker output sound can be decreased.

Since the acoustic transfer space formed between the rear side case 21 and protector 67 can be utilized, the thickness of the apparatus (mobile telephone 1) can be reduced while suppressing deterioration in speaker characteristics. For example, assume a case that does not employ a structure in which an acoustic transfer space is formed between the rear side case 21 and protector 67. When compared to this case, the thickness of the mobile telephone 1 can be reduced by about 0.7 mm (including the compressed thickness of 0.2 mm of the cushion member 52). Therefore, deterioration in characteristics of the speaker output sound can be decreased while reducing the thickness of the apparatus.

Second Exemplary embodiment

The second exemplary embodiment of the present invention will be described with reference to the drawings. The second exemplary embodiment is different from the first exemplary embodiment in that comb-shaped grooves are formed inside the wall of the speaker packaging portion of the rear side case in which the speaker is to packaged. According to this exemplary embodiment, an acoustic transfer space can be ensured by forming the comb-shaped grooves. This enables decreasing deterioration in acoustic characteristics while ensuring the strength of the housing. In this exemplary embodiment, a portion having the same arrangement as that of the first exemplary embodiment will not be described repeatedly, and portions that are different from their equivalents in the first exemplary embodiment will be mainly described.

Figure 14A:
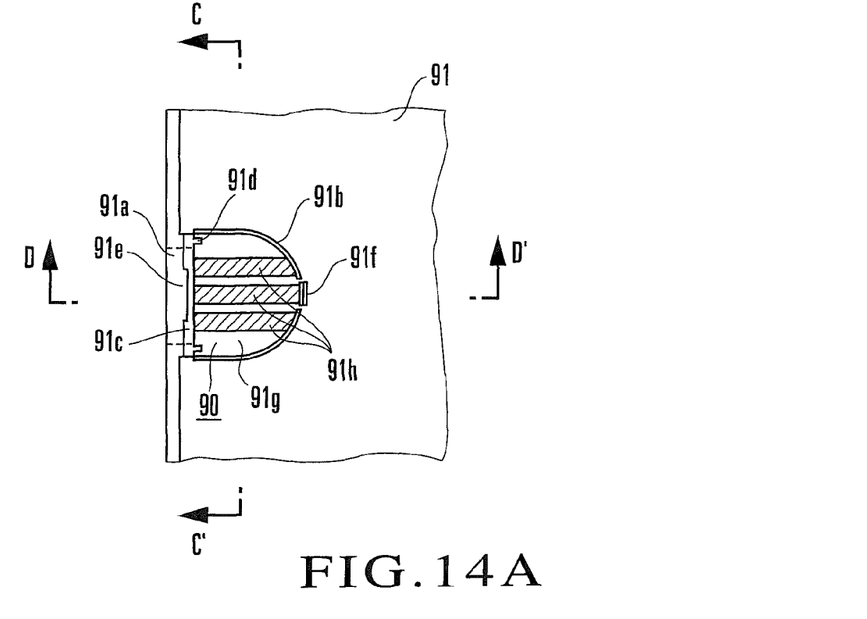
FIGS. 14A to 14C are explanatory views showing another structural example of the speaker packaging portion of the rear side case.
Figure 14B:
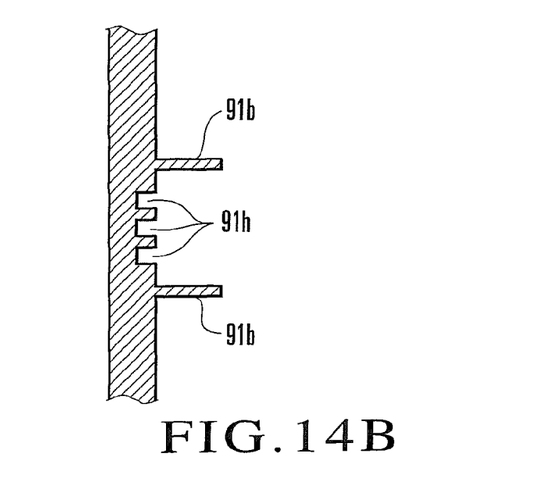
Figure 14C:
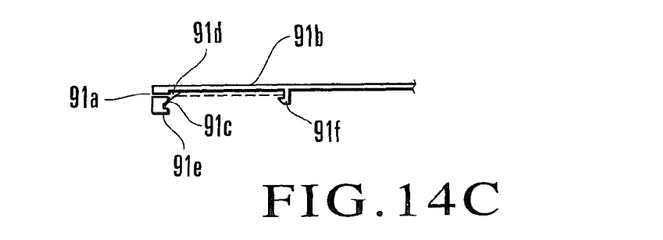

FIGS. 14A to 14C are explanatory views showing another structural example of the speaker packaging portion of the rear side case. FIG. 14A corresponds to a front view of a speaker packaging portion 90 of a rear side case 91 and its periphery seen from the front side when a rear side housing component is provided with grooves 91h so that an output sound from a speaker 5 can be output to a housing sound hole 91a without deterioration. According to this exemplary embodiment, as shown in FIG. 14A, the grooves 91h are formed to extend in a direction perpendicular to the housing sound hole 91a formed in the rear side case 91. FIG. 14B corresponds to a sectional view of the portion of the speaker packaging portion 90 of the rear side case 91 shown in FIG. 14A taken along a plane (the plane C-C' shown in FIG. 14A) perpendicular to the longitudinal direction of the grooves 91h. FIG. 14C corresponds to a sectional view of the portion of the speaker packaging portion 90 of the rear side case 91 shown in FIG. 14A taken along a plane (the plane D-D' shown in FIG. 14A) parallel to the longitudinal direction of the grooves 91h.

According to this exemplary embodiment, the comb-shaped grooves 91h are formed in a speaker seating surface portion 91g on that side of the rear side case 91 which opposes the speaker 5. A case will be described in this exemplary embodiment in which the three grooves 91h are formed in the speaker seating surface portion 91g, as shown in FIGS. 14A and 14B. Alternatively, three or more grooves 91h may be formed. By forming such grooves 91h, an acoustic transfer space can be ensured which allows the output sound output by speaker sound holes 55 to be transferred to the housing sound hole 91a without deteriorating the strength of the rear side case 91 and the sound characteristics.

Other arrangements of the rear side case 91 are the same as those of the rear side case 21 shown in FIGS. 10A and 10B. The housing sound hole 91a is formed in one housing side surface of the rear side case 91. The rear side case 91 is provided with speaker fixing ribs 91b which, when attaching the speaker 5, fix the speaker 5 such that the center of the housing sound hole 91a coincides with the center of the speaker 5. In this case, the speaker fixing ribs 91b vertically hang downward from the speaker seating surface portion 91g to conform to the outer shell of the speaker 5. More specifically, the speaker fixing ribs 91b are provided to form a wall around the speaker 5 when the speaker 5 is fixed.

As shown in FIGS. 14A and 14B, the inner edge of the housing sound hole 91a of the rear side case 91 is provided with cushion urging ribs 91d to fix an inclined portion 66a of the speaker 5 through a cushion member 52. When attaching the speaker 5, the cushion urging ribs 91d come into contact with a cushion abutting surface 91c and the cushion member 52 of the speaker 5 to prevent sound leakage to the interior of the housing. As shown FIG. 14A, the cushion urging ribs 91d are arranged on the left and right sides of the housing sound hole 91a.

In the same manner as in FIG. 11, the rear side case 91 is provided with a fitting portion 91e to fit with a fitting seating surface 57 of the speaker opening 54 when attaching the speaker 5. The rear side case 91 is also provided with a fitting hook 91f to fit with a fitting pawl 56 of the speaker 5, thus fixing the rear side case 91.

The speaker 5 is attached to the rear side case 91 with the structure described above. Thus, when packaging the speaker 5, the cushion member 52 adhered to a protector 67 of the speaker 5 is adhered in contact with the speaker seating surface portion 91g of the rear side case 91. As the cushion member 52 is attached in contact with the speaker seating surface portion 91g, a cavity 50 is formed between the speaker seating surface portion 91g of the rear side case 91 and the protector 67 of the speaker 5. This arrangement can prevent speaker output sound from leaking into the interior of the housing.

As described above according to this exemplary embodiment, the comb-shaped grooves 91h are formed in the speaker packaging portion 90 of the rear side case 91 in which the speaker 5 is to be packaged. When compared to a case in which no grooves 91h are formed in the rear side case 91, a larger acoustic transfer space can be ensured, and deterioration in acoustic characteristics can be decreased while ensuring the strength of the housing.

In the respective exemplary embodiments described above, the speaker 5 is a dynamic type speaker. Alternatively, a speaker 5 other than a dynamic type speaker may be mounted in the mobile telephone 1. For example, a ceramic type speaker which uses a ceramic element as a vibration element can be mounted in the mobile telephone 1.

In the respective exemplary embodiments described above, a monaural speaker is packaged in the mobile telephone 1. Alternatively, stereo speakers which increase in recent years can be mounted in the mobile telephone 1.

The present invention can be applied to a mobile terminal such as a mobile telephone. In particular, the present invention can be applied for decreasing deterioration in characteristics of the speaker output sound in a mobile terminal mounted with a speaker.

The invention claimed is:

1. A mobile terminal characterized by comprising:
    a housing component including a major surface and a side surface; and
    a speaker built in said housing component,
    said housing component comprising a housing side sound hole which is formed in said side surface and outputs a sound from said speaker outside said housing component, and
    said speaker comprising
    a speaker main body which generates the sound,
    a protector as a plate-like component which is arranged on a major surface of said speaker main body opposing said major surface of said housing component and protects said speaker main body,
    a speaker opening which is formed in one side surface of said speaker main body opposing said housing side sound hole and outputs the sound generated by said speaker main body toward said housing side sound hole,
    a support member which is arranged on said protector, supports said speaker attached to said housing component, and forms a cavity communicating with said housing side sound hole between said protector and said housing component, and
    a speaker side sound hole which is formed in said protector and outputs the sound generated by said speaker main body to said cavity.

2. A mobile terminal according to claim 1, characterized in that said housing component further comprises a speaker packaging portion which is provided at a position in contact with said side surface and to which said speaker is attached.

3. A mobile terminal according to claim 1, characterized in that said support member is attached to form a wall that surrounds a region of said protector where said speaker side sound hole is formed.

4. A mobile terminal according to claim 1, characterized in that said housing component further comprises a groove formed in a side of said major surface which opposes said speaker to extend in a direction perpendicular to said housing side sound hole.

5. A mobile terminal according to claim 1, characterized in that said speaker comprises one of a dynamic type speaker and a ceramic type speaker.

6. A mobile terminal according to claim 1, characterized in that said mobile terminal comprises a mobile electronic apparatus in which a speaker that produces one of a sound and a melody is mounted as said speaker.

7. A speaker characterized by comprising:

a speaker main body which generates a sound;

a protector as a plate-like component which is arranged on a major surface of said speaker main body and protects said speaker main body;

a support member arranged on said protector and having a predetermined height;

a speaker opening which is formed in one side surface of said speaker main body and outputs the sound generated by said speaker main body outside; and a speaker side sound hole which is formed in said protector and outputs the sound generated by said speaker main body outside.

8. A speaker according to claim 7, characterized in that said speaker is attached to a housing component of a mobile terminal comprising a major surface, a side surface, and a housing side sound hole formed in said side surface.

9. A speaker according to claim 8, characterized in that said speaker opening is arranged to oppose said housing side sound hole, said protector is arranged to oppose said major surface of said housing component, and said support member supports said speaker when said speaker is attached to said housing component, and forms a cavity communicating with said housing side sound hole between said protector and said housing component.

10. A speaker attaching structure characterized by comprising:

a housing component including a major surface and a side surface; and a speaker built in said housing component, said housing component comprising a housing side sound hole which is formed in said side surface and outputs a sound from said speaker outside said housing component, and said speaker comprising a speaker main body which generates the sound, a protector as a plate-like component which is arranged on a major surface of said speaker main body opposing said major surface of said housing component and protects said speaker main body, a speaker opening which is formed in one side surface of said speaker main body opposing said housing side sound hole and outputs the sound generated by said speaker main body toward said housing side sound hole, a support member which is arranged on said protector, supports said speaker attached to said housing component, and forms a cavity communicating with said housing side sound hole between said protector and said housing component, and a speaker side sound hole which is formed in said protector and outputs the sound generated by said speaker main body to said cavity.

11. A speaker attaching structure according to claim 10, characterized in that said housing component further comprises a groove formed in a side of said major surface which opposes said speaker to extend in a direction perpendicular to said housing side sound hole.

* * * * *